(12) United States Patent
Schmidt et al.

(10) Patent No.: US 7,777,438 B2
(45) Date of Patent: Aug. 17, 2010

(54) MOTOR START CIRCUIT

(75) Inventors: Claus Schmidt, Odense NV (DK); Hans Peter Kristensen, Aabenraa (DK)

(73) Assignee: Danfoss Compressors GmbH, Flensburg (DE)

( * ) Notice: Subject to any disclaimer, the term of this patent is extended or adjusted under 35 U.S.C. 154(b) by 378 days.

(21) Appl. No.: 11/776,246

(22) Filed: Jul. 11, 2007

(65) Prior Publication Data

US 2008/0018293 A1 Jan. 24, 2008

(30) Foreign Application Priority Data

Jul. 19, 2006 (DE) .................. 10 2006 034 499

(51) Int. Cl.
*H02P 1/04* (2006.01)
(52) U.S. Cl. .................. 318/430; 318/774; 318/778; 318/786
(58) Field of Classification Search ........... 318/731, 318/774, 778, 782, 784, 785, 786, 445, 430, 318/431
See application file for complete search history.

(56) References Cited

U.S. PATENT DOCUMENTS

| | | |
|---|---|---|
| 3,562,587 A | 2/1971 | Forst |
| 3,668,489 A | 6/1972 | Erdman |
| 3,766,457 A | 10/1973 | Fink, Jr. et al. |
| 3,792,324 A | 2/1974 | Suarez et al. ............ 318/220 |
| 3,803,866 A | 4/1974 | Barry |
| 4,022,598 A | 5/1977 | Gucwa, Jr. et al. |
| 4,119,884 A | 10/1978 | Blumenberg et al. |
| 4,366,426 A | 12/1982 | Turlej ..................... 318/786 |
| 4,378,520 A | 3/1983 | Ford |
| 4,455,521 A | 6/1984 | Day et al. |
| 4,605,888 A | 8/1986 | Kim ....................... 318/786 |

(Continued)

FOREIGN PATENT DOCUMENTS

CN 2412319 Y 12/2000

(Continued)

OTHER PUBLICATIONS

U.S. Appl. No. 11/935,731 entitled "Motor Start Circuit" filed Nov. 6, 2007 in the name of Schmidt et al.

(Continued)

*Primary Examiner*—Bentsu Ro
*Assistant Examiner*—Thai Dinh
(74) *Attorney, Agent, or Firm*—McCormick, Paulding & Huber LLP

(57) ABSTRACT

Motor start circuit for an induction motor-with a main winding and an auxiliary winding having two end connections supplied with current via current supply connections, and with a start circuit device serving the purpose of stopping the current flow through the auxiliary winding after the start of the motor, and being connected via a conductor to a control device connected between the current supply connections, and with a preset timer device interacting with the start circuit device to stop the current flow through the auxiliary winding, as soon as a predetermined period after the start of the current flow has lapsed. With the purpose of optimizing the motor start circuit, a voltage presetting device, with which a predetermined voltage value can be set, the start circuit device being disconnected if this value is exceeded, and a period duration presetting device, are connected to or integrated in the control device.

19 Claims, 1 Drawing Sheet

U.S. PATENT DOCUMENTS

| | | | |
|---|---|---|---|
| 4,674,021 A | 6/1987 | Sachs | 363/56 |
| 4,772,808 A | 9/1988 | Vial | |
| 4,782,278 A | 11/1988 | Bossi et al. | 318/786 |
| 4,786,850 A | 11/1988 | Chmiel | 318/786 |
| 4,820,964 A | 4/1989 | Kadah et al. | |
| 4,843,295 A | 6/1989 | Thompson et al. | 318/786 |
| 4,862,053 A | 8/1989 | Jordan et al. | 318/786 |
| 5,041,771 A | 8/1991 | Min | 318/786 |
| 5,051,681 A * | 9/1991 | Schwarz | 318/786 |
| 5,103,154 A * | 4/1992 | Dropps et al. | 318/782 |
| 5,296,795 A | 3/1994 | Dropps et al. | 318/778 |
| 5,302,885 A | 4/1994 | Schwarz et al. | 318/781 |
| 5,345,126 A | 9/1994 | Bunch | |
| 5,488,834 A | 2/1996 | Schwarz | |
| 5,528,120 A * | 6/1996 | Brodetsky | 318/785 |
| 5,808,441 A | 9/1998 | Nehring | 318/751 |
| 5,818,122 A | 10/1998 | Miyazawa et al. | 307/10.7 |
| 6,320,348 B1 * | 11/2001 | Kadah | 318/785 |
| 6,982,539 B1 | 1/2006 | Ward | 318/778 |
| 6,989,649 B2 * | 1/2006 | Mehlhorn | 318/806 |
| 2004/0263109 A1 | 12/2004 | Schwarz | 318/778 |
| 2005/0184699 A1 | 8/2005 | Unno | 318/786 |

FOREIGN PATENT DOCUMENTS

| | | |
|---|---|---|
| DE | 197 35 552 | 2/1999 |
| DE | 197 41 828 | 3/1999 |
| DE | 10 2004 018966 | 1/2005 |
| EP | 0 294 118 A2 | 12/1988 |
| EP | 0 571 956 B1 | 12/1993 |
| EP | 0 356 310 B1 | 3/1994 |
| EP | 0 802 621 B1 | 10/1997 |
| EP | 0 924 735 A2 | 6/1999 |
| EP | 1 315 279 A2 | 5/2003 |
| EP | 1 494 346 A2 | 1/2005 |
| EP | 1 240 709 | 11/2005 |
| EP | 1 619 786 A2 | 1/2006 |
| JP | 58-107069 | 6/1983 |
| JP | 60-32583 | 2/1985 |
| JP | 10-225 156 | 8/1998 |
| WO | WO 99/09575 | 2/1999 |
| WO | WO 01/69147 A1 | 9/2001 |
| WO | 2006/001601 A1 | 1/2006 |

OTHER PUBLICATIONS

U.S. Appl. No. 11/740,329 entitled "Motor Start Circuit" filed Apr. 26, 2007 in the name of Schmidt et al.

Chapter 17, Transient Suppressors and Surge Suppressors, pp. 17-1 to 17-17; Robust Electronic Design Reference Book, vol. I, vol. 2, Appendices.

Rachem Circuit Protection, Fundamentals, pp. 15-42.

"Overvoltage Crowbar Sensing Circuit"; Publication No. MC3423/D, Mar. 2005—Rev. 5, pp. 1, 3 and 4.

"Over Voltage Protection"; http:/www.mitedu.freeserve.co.uk/Design/overvoltage.htm; pp. 1-2; Aug. 10, 2005.

* cited by examiner

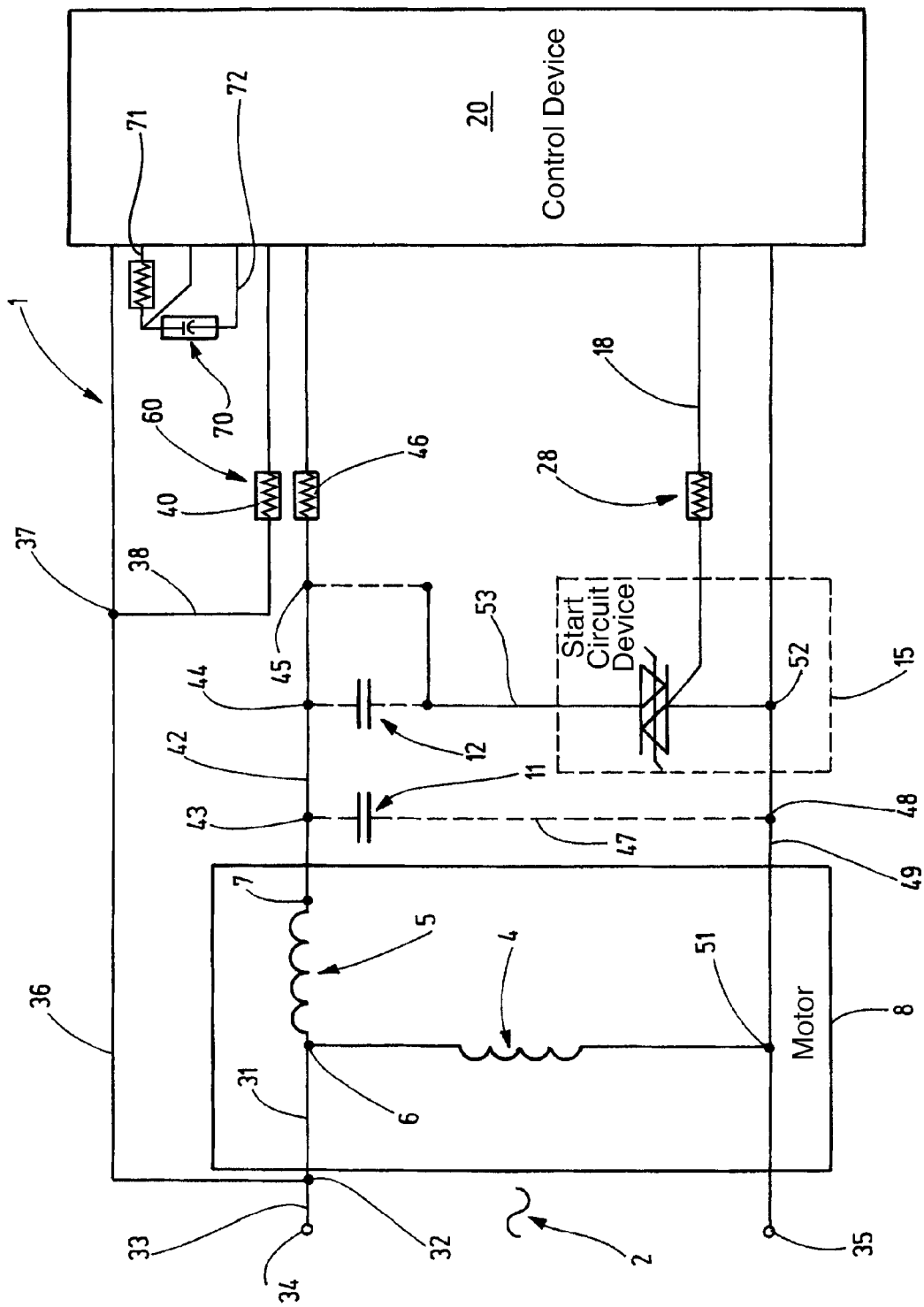

MOTOR START CIRCUIT

CROSS REFERENCE TO RELATED APPLICATIONS

Applicant hereby claims foreign priority benefits under U.S.C. §119 from German Patent Application No. 10 2006 034 499.5 filed on Jul. 19, 2006, the contents of which are incorporated by reference herein.

FIELD OF THE INVENTION

The invention concerns a motor start circuit for an induction motor, particularly a single phase AC induction motor, with a main winding and an auxiliary winding having two end connections supplied with current, mainly AC, via current supply connections, and with a start device serving the purpose of stopping the current flow through the auxiliary winding after the start of the motor, and being connected via a conductor to a control device connected between the current supply connections, and with a preset timer device interacting with the start device to stop the current flow through the auxiliary winding, as soon as a predetermined period after the start of the current flow has lapsed. The invention further concerns a circuit board with a previously described motor start circuit. The invention further concerns a method for starting an induction motor, particularly a single phase AC induction motor, with a previously described motor start circuit.

BACKGROUND OF THE INVENTION

The European patent EP 1 240 709 B1 discloses a motor start circuit for a single phase induction motor with an running main winding and a start auxiliary winding, in which a switch connected in series with the auxiliary winding enables the AC to flow through the auxiliary winding to start the motor and then turns off the AC flowing through the auxiliary winding, as soon as the motor starts operating. A voltage sensor measures the motor voltage at the auxiliary winding or at main and auxiliary windings and generates a motor voltage signal representing the size of the measured motor voltage. The motor voltage signal is provided with a differentiator, which generates a dV/dT signal representing the time rate of the change of the motor voltage signal. A gate circuit, connected to a gate of the switch, receives the dV/dT signal and disconnects the switch, when the dV/dT signal reaches or exceeds a predetermined value. A preset timer disconnects the switch after the lapse of a predetermined period from the start of flow of motor current. Further, the U.S. Pat. No. 5,528,120 discloses a motor start circuit for a single phase AC induction motor, in which the start voltage of the measuring device is adjustable, for example in that the size of a variable resistance is changed. Further, U.S. Pat. No. 3,792,324 discloses a single phase motor, in which the current flow is stopped by the auxiliary winding, as soon as a measured current or voltage value exceeds a reference value. U.S. Pat. No. 6,982,539 B1 discloses a motor start circuit with a control circuit comprising a timer and a voltage sensor.

SUMMARY OF THE INVENTION

It is the task of the invention to provide a motor start circuit for an induction motor, particularly a single phase AC induction motor, with a main winding and auxiliary winding having two end connections supplied with current, mainly AC, via current supply connections, and with a start circuit device serving the purpose of stopping the current flow through the auxiliary winding after the start of the motor, and being connected via a conductor to a control device connected between the current supply connections, and with a preset timer device interacting with the start circuit device to stop the current flow through the auxiliary winding, as soon as a predetermined period after the start of the current flow has lapsed, and/or a circuit board with such a motor start circuit, which is optimized with regard to energy consumption and manufacturing costs.

With a motor start circuit for an induction motor, particularly a single phase AC induction motor, with a main winding and an auxiliary winding having two end connections supplied with current, mainly AC, via current supply connections, and with a start device serving the purpose of stopping the current flow through the auxiliary winding after the start of the motor, and being connected via a conductor to a control device connected between the current supply connections, and with a preset timer device interacting with the start device to stop the current flow through the auxiliary winding, as soon as a predetermined period after the start of the current flow has lapsed this task is solved in that a voltage presetting device, with which a voltage value can be set, the start circuit device being disconnected when this value is exceeded, and a period duration presetting device, by means of which the predetermined period can be set, after the lapse of which the start circuit device is disconnected by means of the control device, are connected to or integrated in the control device. The voltage presetting device and the period duration presetting device make it possible in a simple manner that the same motor start circuit can be used in the industrial mass production for different induction motors, as, for example, different sizes of resistors are used.

A preferred embodiment of the motor start circuit is characterised in that the voltage presetting device comprises at least two resistors. The predetermined voltage value can then be set by means of the size of the resistors.

A further preferred embodiment of the motor start circuit is characterised in that the period duration presetting device comprises at least one resistor and/or a capacitor. By means of the size of the resistor and/or the capacitor, the predetermined period duration can be set.

A further preferred embodiment of the motor start circuit is characterised in that the motor start circuit comprises a control circuit, in which the two end connections of the auxiliary winding are connected to the control device. The main winding is also called run winding. The auxiliary winding is also called start winding. The control circuit with the voltage presetting device and the period duration setting device provides a simple manner of adapting the motor start circuit according to the invention to different motors, in particular to different compressors driven by the motors.

A further preferred embodiment of the motor start circuit is characterised in that a first end connection of the auxiliary winding is connected to a first current supply connection and the control device via at least one conductor.

A further preferred embodiment of the motor start circuit is characterised in that the first end connection of the auxiliary winding and the first current supply connection are connected to the control device via a conductor.

A further preferred embodiment of the motor start circuit is characterised in that a further conductor branches off from the conductor, said further conductor being connected to the control device and comprising a resistor of the voltage presetting device.

A further preferred embodiment of the motor start circuit is characterised in that a second end connection of the auxiliary winding is connected to the control device via at least one conductor.

A further preferred embodiment of the motor start circuit is characterised in that a further conductor branches off from the conductor, said further conductor being connected to the second current supply connection and comprising a series connection of a start capacitor and the start circuit device.

A further preferred embodiment of the motor start circuit is characterised in that a further resistor of the voltage presetting device is located in the conductor.

The invention also concerns a circuit board with a motor start circuit as described above. The circuit board is a printed circuit board, also called printed wiring board, serving as carrier for electronic components.

A preferred embodiment of the circuit board is characterised in that the circuit board comprises a programmable chip. The design and manufacturing of integrated circuits are expected to be known.

With a method for starting an induction motor, in particular a single phase AC induction motor, with a motor start circuit as described above, the previously stated task is solved in that the predetermined voltage value is preset by means of the voltage presetting device and the predetermined period duration is preset by means of the period duration setting device. The predetermined voltage value and the predetermined period duration are adapted to the size of the motor used.

A preferred embodiment of the method is characterised in that the voltage over the auxiliary winding is monitored by means of the control circuit. During normal operation of the motor start circuit the voltage increases. If, however, the voltage does not increase, for example because the rotor of the motor is blocked, there is a risk that the start circuit device remains on for too long, which could cause damage.

A further preferred embodiment of the method is characterised in that the start circuit device is turned off by means of the control device, as soon as the voltage over the auxiliary winding exceeds the predetermined value. Thus, the period during which the start circuit device is turned on is reduced.

A further preferred embodiment of the method is characterised in that the predetermined voltage value is between 100 and 1000 Volts, in particular between 400 and 600 Volts. In connection with the present invention these ranges have turned out to be particularly advantageous. The predetermined voltage value depends on the motor used.

A further preferred embodiment of the method is characterised in that the start circuit device is turned off by means of the control device, as soon as the predetermined period duration after the beginning of the current flow has lapsed and the voltage over the auxiliary winding has not exceeded the predetermined value. This prevents the start circuit device from being turned on for too long, if, for example, the rotor is blocked.

A further preferred embodiment of the method is characterised in that the predetermined period duration is between 1 and 10 seconds, in particular between 2 and 6 seconds.

In connection with the present invention, these period durations have turned out to be particularly advantageous. The predetermined period duration depends on the motor used.

BRIEF DESCRIPTION OF THE DRAWINGS

Further advantages, characteristics and details of the invention occur from the following description, in which an embodiment is described in detail with reference to the drawing.

The enclosed drawing shows a diagram of a motor start circuit according to the invention.

DETAILED DESCRIPTION OF THE INVENTION

The enclosed FIGURE shows a motor start circuit 1 for a single phase AC induction motor in the form of a diagram. A symbol 2 shows that the motor start circuit 1 is driven by means of AC. The motor comprises a main winding 4, also called run winding, and an auxiliary winding 5, also called start winding. The auxiliary winding 5 has two end connections 6, 7. A rectangle 8 shows that the motor with the main winding 4 and the auxiliary winding 5 is made in one component.

The motor start circuit 1 is provided with a run capacitor 11 and a start capacitor 12. The start capacitor 12 is turned off by means of a circuit 15, also called start circuit device, after the start of the motor in that the circuit 15 opens.

In the example shown, the circuit 15 is a semi-conductor circuit and is connected to a control device 20 via a conductor 18. The control device 20 is an electronic controller, which is connected to the auxiliary winding 5. Reference number 28 shows that the gate current settings are programmable or adjustable in that different resistances are inserted.

The first end connection 6 of the auxiliary winding 5 is connected to a first current supply connection 34 via a conductor 31, a conductor branch 32 and a conductor 33. A second current supply connection 35 is facing the first current supply connection 34. A conductor 36 with a second conductor branch 37 leads from the conductor branch 32 to the control device 20. A conductor 38 comprising a resistor 40 leads from the conductor branch 37 to the control device 20.

The second end connection 7 of the auxiliary winding 5 is connected to the control device 20 via a conductor 42, in which three conductor branches 43, 44, 45 and a resistor 46 are located. An intermittently shown conductor 47 comprising the run capacitor 11 leads from the conductor branch 43 to a further conductor branch 48 that is provided in a conductor 49. The conductor 49 connects the current connection 35 to the control device 20. The conductor 49 comprises two conductor branches 51, 52. The main winding 4 is located between the conductor branch 51 and the first end connection 7 of the auxiliary winding 5. A conductor 53 extends from the conductor branch 52 to the conductor branch 44. The start capacitor 12 is located in the conductor 53.

The conductor 38 with the resistor 40 serves as voltage divider. The two resistors 40, 46 form a voltage presetting device 60. By means of the size of the resistors 40, 46 the voltage value can be set, the start circuit device 15 being turned off by means of the control device if this value is exceeded. If a motor provided with the motor start circuit 1 starts in a normal manner, the voltage increases and the start circuit device 15 is turned off by the control device 20, as soon as the predetermined voltage value has been reached. If the voltage does not increase, for example because the rotor of the motor is blocked, there is a risk that the start switch 15 will remain turned on for too long, which could cause damage to the start circuit device 15 and/or the auxiliary winding 5.

According to an essential aspect of the present invention, the auxiliary winding 5 will also be turned off, if the voltage has not reached the programmed voltage value within a programmed period. For this purpose a period duration presetting device 70 is connected to the control device 20 via conductors 71, 72. The period duration presetting device 70 comprises a resistor and a capacitor. By means of the size of the resistor and the capacitor the period duration can be set, a start attempt of the start circuit being turned off after the lapse of said period, if the voltage does not exceed the predetermined voltage value.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A motor start circuit for an induction motor with a main winding and an auxiliary winding having two end connections supplied with current via current supply connections, the motor start circuit comprising:
    a control device being connected between the current supply connections;
    a start circuit device for stopping the current flow through the auxiliary winding after the start of the motor and being connected via a conductor to the control device;
    a period duration presetting device setting a predetermined period and being connected to or integrated in the control device, wherein a preset timer device of the control device interacts with the start circuit device to stop the current flow through the auxiliary winding when the predetermined period after the start of the current flow lapses; and
    a voltage presetting device setting a predetermined voltage value and being connected to the control device, wherein the control device interacts with the start circuit device to stop the current flow through the auxiliary winding when the predetermined voltage value is exceeded;
    wherein a second end connection of the auxiliary winding is connected to the control device via at least one additional conductor, the at least one additional conductor comprising a resistor of the voltage presetting device.

2. The motor start circuit according to claim 1, wherein the voltage presetting device comprises at least two resistors.

3. The motor start circuit according to claim 1, wherein the period duration presetting device comprises at least one resistor and/or a capacitor.

4. The motor start circuit according to claim 1, wherein the motor start circuit further comprises a control circuit, in which the two end connections of the auxiliary winding are connected to the control device.

5. The motor start circuit according to claim 1, wherein a first end connection of the auxiliary winding is connected to a first current supply connection and the control device via at least one further conductor.

6. The motor start circuit according to claim 1, wherein a first end connection of the auxiliary winding and a first current supply connection are connected to the control device via one further conductor.

7. The motor start circuit according to claim 6, wherein a second further conductor branches off from the one further conductor, said second further conductor being connected to the control device and comprising another resistor of the voltage presetting device.

8. The motor start circuit according to claim 1, wherein a further conductor branches off from the at least one additional conductor, said further conductor being connected to the second current supply connection and comprising a run capacitor.

9. The motor start circuit according to claim 1 wherein a further conductor branches off from the at least one additional conductor, said further conductor being connected to the second current supply connection and comprising a series connection of a start capacitor and the start circuit device.

10. A circuit board with a motor start circuit according to claim 1.

11. The circuit board according to claim 10, wherein the circuit board comprises a programmable chip.

12. A method for starting an induction motor with the motor start circuit according to claim 1, comprising:
    presetting the predetermined voltage value using the voltage presetting device; and
    presetting the predetermined period duration using the period duration setting device.

13. The method according to claim 12, further comprising:
    monitoring the voltage over the auxiliary winding using the control device.

14. The method according to claim 13, further comprising:
    turning off the start circuit device using the control device when the voltage over the auxiliary winding exceeds the predetermined value.

15. The method according to claim 14, wherein the predetermined voltage value is between 100 and 1000 Volts.

16. The method according to claim 14 further comprising:
    turning off the start circuit device using the control device when the predetermined period duration after the beginning of the current flow lapses and the voltage over the auxiliary winding has not exceeded the predetermined voltage value.

17. The method according to claim 16, wherein the predetermined period duration is between 1 and 10 seconds.

18. A motor start circuit for an induction motor having a main winding and an auxiliary winding having two end connections supplied with current via first and second current supply connections, a first end of each winding being connected to the first current supply connection and a second end of the main winding being connected to the second current supply connection, the motor start circuit comprising:
    a start circuit device being connected between a second end of the auxiliary winding and the second current supply connection, wherein the current flow through the auxiliary winding is stopped when the start circuit device is turned off;
    a voltage presetting device being connected to the first current supply connection, the second end of the auxiliary winding and the start circuit device via a conductor, wherein the voltage presetting device sets a predetermined voltage value, wherein the start circuit device is turned off when the predetermined voltage value is exceeded;
    a control device being connected to the voltage presetting device and between the first and second current supply connections, wherein the control device is connected to the first current supply connection via an additional conductor, wherein a further conductor branches off from the additional conductor and is connected to the control device, and wherein the further conductor comprises a resistor of the voltage presetting device; and
    a period duration presetting device being connected to the control device, wherein the period duration presetting device sets a predetermined period, wherein the start circuit device is turned off by the control device when the predetermined period lapses.

19. A motor start circuit for an induction motor with a main winding and an auxiliary winding having two end connections supplied with current via current supply connections, the motor start circuit comprising:
    a control device being connected between the current supply connections;

a start circuit device for stopping the current flow through the auxiliary winding after the start of the motor and being connected via a conductor to the control device;

a period duration presetting device setting a predetermined period and being connected to or integrated in the control device, wherein a preset timer device interacts with the start circuit device to stop the current flow through the auxiliary winding when the predetermined period after the start of the current flow lapses; and a voltage presetting device setting a predetermined voltage value, wherein the start circuit device to stop the current flow through the auxiliary winding when the predetermined voltage value is exceeded;

wherein the conductor further comprises a resistor of the voltage presetting device.

* * * * *